US011855520B2

(12) United States Patent
Yoneda

(10) Patent No.: US 11,855,520 B2
(45) Date of Patent: Dec. 26, 2023

(54) ELECTRIC TOOL, CONTROL METHOD, AND PROGRAM

(71) Applicant: Panasonic Intellectual Property Management Co., Ltd., Osaka (JP)

(72) Inventor: Fumiiki Yoneda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 478 days.

(21) Appl. No.: 17/260,667

(22) PCT Filed: Jun. 14, 2019

(86) PCT No.: PCT/JP2019/023591
§ 371 (c)(1),
(2) Date: Jan. 15, 2021

(87) PCT Pub. No.: WO2020/017202
PCT Pub. Date: Jan. 23, 2020

(65) Prior Publication Data
US 2022/0140694 A1 May 5, 2022

(30) Foreign Application Priority Data

Jul. 18, 2018 (JP) ................................ 2018-135365

(51) Int. Cl.
*H02P 6/06* (2006.01)
*H02K 11/33* (2016.01)
(Continued)

(52) U.S. Cl.
CPC ............... *H02K 7/145* (2013.01); *B25F 5/00* (2013.01); *H02K 11/26* (2016.01); *H02K 11/33* (2016.01); *H02P 6/06* (2013.01)

(58) Field of Classification Search
CPC ........ H02K 7/145; H02K 11/26; H02K 11/33; B25F 5/00; H02P 6/06
(Continued)

(56) References Cited

U.S. PATENT DOCUMENTS 6,166,514 A * 12/2000 Ando .................... B60L 15/025
318/811
2004/0245961 A1 12/2004 Ueda et al.
(Continued)

FOREIGN PATENT DOCUMENTS

CN 103066902 A 4/2013
JP 2003-348885 A 12/2003
(Continued)

OTHER PUBLICATIONS

Ito et al. (JP 2012010488 A) Motor System, Power Converter, and Control Method for Power Converter Date Published Jan. 12, 2012 (Year: 2012).*
(Continued)

*Primary Examiner* — Jorge L Carrasquillo
(74) *Attorney, Agent, or Firm* — Renner, Otto, Boisselle & Sklar, LLP

(57) ABSTRACT

An electric tool includes a motor and a motor control device. The motor control device is configured to update a command value of a speed of the motor based on a parameter relating to at least one of a voltage of a direct-current power supply for the motor or a magnitude of a load applied to the motor during rotation of the motor.

14 Claims, 5 Drawing Sheets

(51) Int. Cl.
  *B25F 5/00* (2006.01)
  *H02K 11/26* (2016.01)
  *H02K 7/14* (2006.01)

(58) Field of Classification Search
  USPC .................................................. 318/400.22
  See application file for complete search history.

(56) References Cited

U.S. PATENT DOCUMENTS

| | | | |
|---|---|---|---|
| 2009/0237015 | A1 | 9/2009 | Hashimoto et al. |
| 2011/0241583 | A1 | 10/2011 | He et al. |
| 2012/0191250 | A1 | 7/2012 | Iwata |
| 2013/0264987 | A1 | 10/2013 | Uchida et al. |
| 2016/0008961 | A1 | 1/2016 | Takano |
| 2018/0191288 | A1* | 7/2018 | Li .......................... H02P 6/185 |

FOREIGN PATENT DOCUMENTS

| | | | |
|---|---|---|---|
| JP | 2005-210793 | A | 8/2005 |
| JP | 2006-204050 | A | 8/2006 |
| JP | 2009-232498 | A | 10/2009 |
| JP | 2013-198374 | A | 9/2013 |
| JP | 5408535 | B2 | 2/2014 |
| JP | 2015-213400 | A | 11/2015 |
| JP | 2015-226331 | A | 12/2015 |
| JP | 2016-093854 | A | 5/2016 |
| JP | 6044707 | B2 | 12/2016 |
| WO | 2013/027527 | A1 | 2/2013 |

OTHER PUBLICATIONS

Ogawa et al. (CN 103299539 A) Power Converting Device Date Published Sep. 11, 2013 (Year: 2013).*
International Search Report for corresponding Application No. PCT/JP2019/023591, dated Aug. 27, 2019.
Written Opinion for corresponding Application No. PCT/JP2019/023591, dated Aug. 27, 2019.
Extended European Search Report for corresponding European Patent Application No. 19837780.6, dated Sep. 15, 2021.

* cited by examiner

ELECTRIC TOOL, CONTROL METHOD, AND PROGRAM

TECHNICAL FIELD

The present disclosure generally relates to electric tools, control methods, and programs. The present disclosure specifically relates to an electric tool configured to control a motor by a direct-current power supply, a control method of controlling the motor by the direct-current power supply, and a program for executing the control method.

BACKGROUND ART

Patent Literature 1 discloses a power tool. The power tool disclosed in Patent Literature 1 includes: a motor; a driving circuit that supplies electric power from a power supply to the motor; and a control part that sets a target rotation number for the motor in accordance with a mode selected from a plurality of modes, each mode having a corresponding target rotation number. The power tool further includes a voltage detecting circuit for detecting the voltage of the power supply while the motor is stopped, and the target rotation number is changeably set based on the detected voltage.

In Patent Literature 1, the target rotation number (the speed of the motor) is set based on the voltage of the power supply while the motor is stopped. However, while the motor is rotating, the magnitude of a load applied to the motor and the voltage of the power supply may vary. Thus, in Patent Literature 1, rotation of the motor may be continued while the operation efficiency of the motor remains low.

CITATION LIST

Patent Literature

Patent Literature 1: JP 5408535 B2

SUMMARY OF INVENTION

An object is to provide an electric tool, a control method, and a program that can improve the operation efficiency of a motor.

An electric tool of one aspect of the present disclosure includes a motor and a motor control device. The motor control device is configured to update a command value of a speed of the motor based on a parameter. The parameter relates to at least one of a voltage of a direct-current power supply for the motor or a magnitude of a load applied to the motor during rotation of the motor.

A control method of another aspect of the present disclosure is a control method of a motor and includes updating a command value of a speed of the motor based on a parameter. The parameter relates to at least one of a voltage of a direct-current power supply for the motor or a magnitude of a load applied to the motor during rotation of the motor.

A program of still another aspect of the present disclosure is a program configured to cause a computer system to execute the control method.

DESCRIPTION OF EMBODIMENTS

1. Embodiment

1.1 Schema

Figure 1:
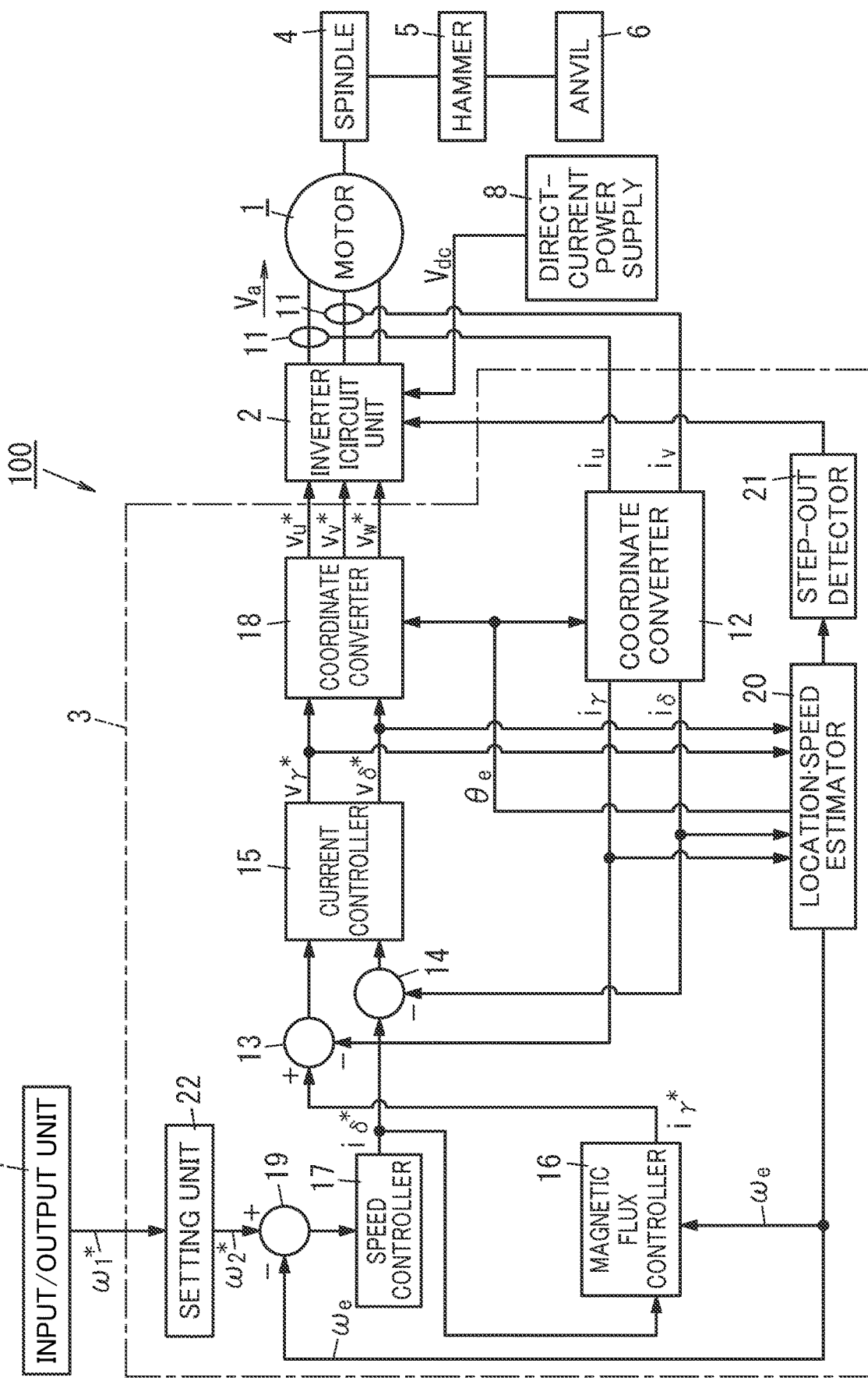
FIG. 1 is a block diagram illustrating an electric tool of an embodiment.

FIG. 1 shows a block diagram of an electric tool 100 of an embodiment. The electric tool 100 includes a motor 1 and a motor control device 3. The motor control device 3 updates a command value $\omega_2^*$ of the speed of the motor 1 based on a parameter relating to at least one of a voltage $V_{dc}$ of a direct-current power supply 8 for the motor 1 or the magnitude of a load applied to the motor 1 during rotation of the motor 1.

In the electric tool 100, a state during rotation of the motor 1 can be reflected in the command value $\omega_2^*$. That is, the motor control device 3 does not maintain constant the command value $\omega_2^*$ of the speed of the motor 1 but can dynamically (adaptationally) control the command value $\omega_2^*$. In particular, the state during the rotation of the motor 1 includes at least one of the magnitude of the load applied to the motor 1 or the voltage $V_{dc}$ of the direct-current power supply 8 for the motor 1, and the magnitude and the voltage $V_{dc}$ may contribute to the improvement of the operation efficiency of the motor 1. As described above, the electric tool 100 provides the effect that the operation efficiency of the motor 1 can be improved.

1.2 Configuration

The electric tool 100 of the present embodiment will be described in detail below. The electric tool 100 is a rotary impact tool (an impact driver). As illustrated in FIG. 1, the electric tool 100 includes the motor 1, an inverter circuit unit 2, the motor control device 3, a spindle 4, a hammer 5, an anvil 6, an input/output unit 7, and the direct-current power supply 8. The electric tool 100 further includes two phase current sensors 11.

The spindle 4, the hammer 5, and the anvil 6 are devices for performing prescribed work in the electric tool 100. The spindle 4 is coupled to an output shaft (a rotor) of the motor 1. The spindle 4 is rotated by rotation of the motor 1. The hammer 5 is coupled to the spindle 4. The hammer 5 rotates together with the spindle 4. Moreover, the hammer 5 is urged by a spring or the like to the anvil 6, the hammer 5 and the anvil 6 engage each other, and rotation of the hammer 5 is transmitted to the anvil 6.

The motor 1 is coupled to the spindle 4. The motor 1 is a DC motor equipped with a brush or a DC brushless motor. In the present embodiment, the motor 1 is a DC brushless motor (a three-phase permanent magnet synchronization motor), and the motor 1 includes a rotor including a permanent magnet and a stator including armature winding wires for three phases (i.e., a U phase, a V phase, and a W phase).

The direct-current power supply 8 is a power supply used to drive the motor 1. In the present embodiment, the direct-current power supply 8 is a secondary battery. The direct-current power supply 8 is a so-called, battery pack. The direct-current power supply 8 also serves as a power supply for the inverter circuit unit 2 and the motor control device 3.

The inverter circuit unit 2 is a circuit for driving the motor 1. The inverter circuit unit 2 converts the voltage $V_{dc}$ from the direct-current power supply 8 into a drive voltage $V_a$ for the motor 1. In the present embodiment, the drive voltage $V_a$ is a three-phase alternating-current voltage including a U-phase voltage, a V-phase voltage, and a W-phase voltage. In the following description, the U-phase voltage is denoted by "$v_u$", the V-phase voltage is denoted by "$v_v$", and the W-phase voltage is denoted by "$v_w$" as necessary. Moreover, each of the voltages $v_u$, $v_v$, and $v_w$ is a sinusoidal voltage. The inverter circuit unit 2 can be implemented by using a PWM inverter and a PWM converter. The PWM converter generates a PWM signal pulse-width-modulated in accordance with target values (voltage command values) $v_u^*$, $v_v^*$, and $v_w^*$ of the drive voltage $V_a$ (the U-phase voltage $v_u$, the V-phase voltage $v_v$, and the W-phase voltage $v_w$). The PWM inverter applies the drive voltage $V_a$ ($v_u$, $v_v$, $v_w$) according to the PWM signal to the motor 1, thereby driving the motor 1. More specifically, the PWM inverter includes half-bridge circuits and drivers for the three phases. In the PWM inverter, the drivers turn on/off switch elements in respective half-bridge circuits in accordance with the PWM signal, thereby applying the drive voltage $V_a$ ($v_u$, $v_v$, and $v_w$) according to voltage command values $v_u^*$, $v_v^*$, and $v_w^*$ to the motor 1. Thus, the motor 1 is supplied with a drive current according to the drive voltage $V_a$ ($v_u$, $v_v$, and $v_w$). The drive current includes a U-phase current $i_u$, a V-phase current $i_v$, and a W-phase current $i_w$. Specifically, the U-phase current $i_u$, the V-phase current $i_v$, and the W-phase current $i_w$ are a current of the armature winding wire for the U phase, a current of the armature winding wire for the V phase, and a current of the armature winding wire for the W phase respectively in the stator of the motor 1.

The two phase current sensors 11 measures the U-phase current $i_u$ and the V-phase current $i_v$ of the drive current supplied from the inverter circuit unit 2 to the motor 1. Note that the W-phase current $i_w$ is obtainable from the U-phase current $i_u$ and the V-phase current $i_v$. Note that the electric tool 10 may include a current detector including a shunt resistor or the like in place of the phase current sensor 11.

The input/output unit 7 is a user interface. The input/output unit 7 includes devices (e.g., a display apparatus, an inputter, and an operation device) for display regarding operation of the electric tool 100, setting of the operation of the electric tool 100, and an operation given to the electric tool 100. In the present embodiment, the input/output unit 7 has a function of setting a target value $\omega_1^*$ of the speed of the motor 1. For example, the input/output unit 7 determines the target value $\omega_1^*$ in accordance with an operation given by a user and gives the target value $\omega_1^*$ to the motor control device 3.

The motor control device 3 determines and updates the command value $\omega_2^*$ of the speed of the motor 1. In particular, the motor control device 3 determines and updates the command value $\omega_2^*$ of the speed of the motor 1 based on the target value $\omega_1^*$ of the speed of the motor 1 given by the input/output unit 7. Moreover, the motor control device 3 determines the target values (the voltage command values) $v_u^*$, $v_v^*$, and $v_w^*$ of the drive voltage $V_a$ such that the speed of the motor 1 matches the command value $\omega_2^*$, and the motor control device 3 gives the target values to the inverter circuit unit 2.

The motor control device 3 will be described below in further detail. In the present embodiment, the motor control device 3 controls the motor 1 by vector control. The vector control is a type of motor control methods of: resolving a motor current into a current component that generates torque (rotational force) and a current component that generates magnetic flux; and independently controlling the current components.

Figure 2:
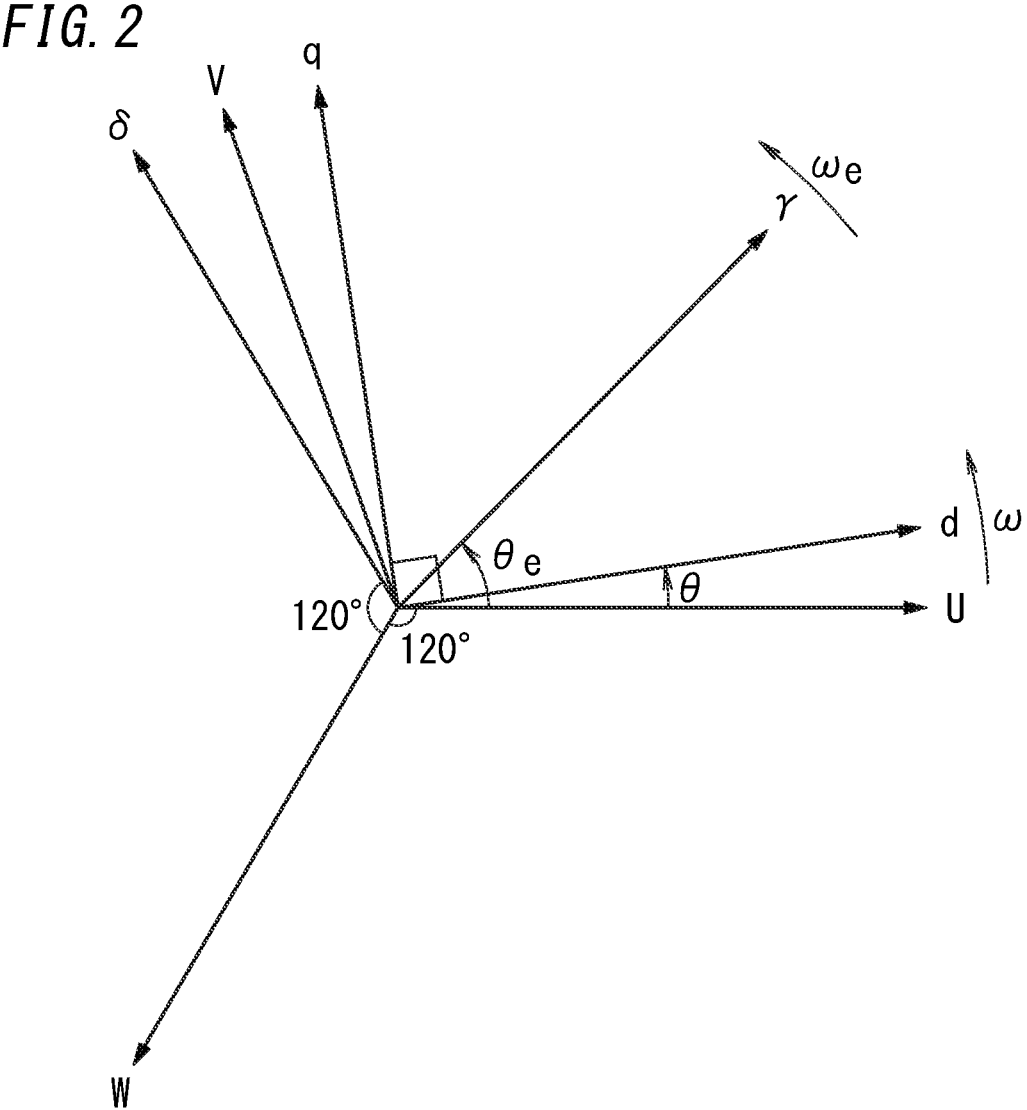
FIG. 2 is a view illustrating control of the electric tool by a motor control device.

FIG. 2 is an analytical model diagram of the motor 1 in the vector control. In FIG. 2, armature winding wire fixed axes of the U phase, the V phase, and the W phase are shown. The vector control takes into consideration a rotating coordinate system that rotates at the same speed as the rotation speed of magnetic flux generated by the permanent magnet provided to the rotor of the motor 1. In the rotating coordinate system, the direction of the magnetic flux generated by the permanent magnet is represented by the d-axis, and a control rotary axis corresponding to the d-axis is represented by the γ-axis. Moreover, a phase advanced by an electric angle of 90 degrees from the d-axis is represented by the q-axis, and a phase advanced by an electric angle of 90 degrees from the γ-axis is represented by the δ-axis. The rotating coordinate system corresponding to a real axis is a coordinate system obtained by selecting the d-axis and the q-axis as coordinate axes, and the coordinate axes are referred to as dq-axes. A control rotating coordinate system is a coordinate system obtained by selecting the γ-axis and the δ-axis as coordinate axes, and the coordinate axes are referred to as γδ-axes.

The dq-axes are rotating, and the rotational speed of the dq-axes is represented by ω. The γδ-axes are also rotating, and the rotational speed of the γδ-axes is represented by $\omega_e$. Moreover, on the dq-axes, the angle (phase) of the d-axis viewed from the armature winding wire fixed axis of the U phase is represented by θ. Similarly, on the γδ-axis, the angle (phase) of the γ-axis viewed on the armature winding wire fixed axis of the U phase is represented by $\theta_e$. The angles represented by θ and $\theta_e$ are angles in electric angle and are also referred to as rotor locations or magnetic pole locations in general. The rotational speeds represented by ω and $\omega_e$ are angular velocities in electric angle. In the following description, the θ or $\theta_e$ is also referred to as a rotor location, and the ω or $\omega_e$ is also simply referred to as a speed as necessary. When the rotor location and the speed of the motor are derived by estimation, the γ-axis and the δ-axis are also referred to as control estimation axes.

The motor control device 3 basically performs the vector control such that the θ and $\theta_e$ match each other. When the θ and the $\theta_e$ match each other, the d-axis and the q-axis respectively match the γ-axis and the δ-axis. Note that in the following description, a γ-axis component and a δ-axis component of the drive voltage $V_a$ are respectively represented by a γ-axis voltage $v_\gamma$ and a δ-axis voltage $v_\delta$, and a γ-axis component and a δ-axis component of the drive current are respectively represented by a γ-axis current $i_\gamma$ and a δ-axis current $i_\delta$ as necessary.

Moreover, voltage command values representing target values of the γ-axis voltage $v_\gamma$ and the δ-axis voltage $v_\delta$ are respectively represented by a γ-axis voltage command value $v_\gamma^*$ and a δ-axis voltage command value $v_\delta^*$. Current command values representing target values of the γ-axis current $i_\gamma$ and the δ-axis current $i_\delta$ are respectively represented by an γ-axis current command value $i_\gamma^*$ and a δ-axis current command value $i_\delta^*$.

The motor control device 3 performs the vector control such that values of the γ-axis voltage $v_\gamma$ and the δ-axis voltage $v_\delta$ respectively follow the γ-axis voltage command value $v_\gamma^*$ and the δ-axis voltage command value ye, and values of the γ-axis current $i_\gamma$ and the δ-axis current $i_\delta$ respectively follow the γ-axis current command value $i_\gamma^*$ and the δ-axis current command value $i_\delta^*$.

The motor control device 3 updates command values ($i_\gamma^*$, $i_\delta^*$, $v_\gamma^*$, $v_u^*$, $v_v^*$, and $v_w^*$) and state quantities ($i_u$, $i_v$, $i_\gamma$, $i_\delta$, $\theta_e$, and $\omega_e$) which are calculated (or detected) and are then output by the motor control device 3 itself at a prescribed updating cycle.

The motor control device 3 may be implemented by, for example, a computer system including one or more processors (e.g., microprocessors) and one or more memories. That is, the one or more processors execute one or more programs stored in the one or more memories to function as the motor control device 3. The one or more programs may be stored in the one or more memories in advance, provided via a telecommunications network such as the Internet, or provided by a non-transitory storage medium such as a memory card storing the program.

As illustrated in FIG. 1, the motor control device 3 includes a coordinate converter 12, a subtractor 13, a subtractor 14, a current controller 15, a magnetic flux controller 16, a speed controller 17, a coordinate converter 18, a subtractor 19, a location•speed estimator 20, a step-out detector 21, and a setting unit 22. Note that the coordinate converter 12, the subtractors 13, 14, and 19, the current controller 15, the magnetic flux controller 16, the speed controller 17, the coordinate converter 18, the location•speed estimator 20, the step-out detector 21, and the setting unit 22 do not necessarily represent respective components as entities but represent functions implemented by the motor control device 3. Thus, elements of the motor control device 3 may freely use respective values generated in the motor control device 3.

The coordinate converter 12 performs coordinate transformation of the U-phase current $i_u$ and the V-phase current onto the γδ-axis based on the rotor location $\theta_e$ to calculate and output the γ-axis current $i_\gamma$ and the δ-axis current $i_\delta$ respectively. Here, the γ-axis current $i_\gamma$ corresponds to a d-axis current, is an excitation current, and is a current that hardly contributes to torque. The δ-axis current $i_\delta$ corresponds to a q-axis current and is a current that greatly contributes to torque. The rotor location $\theta_e$ is calculated by the location•speed estimator 20.

The subtractor 19 refers to the speed $\omega_e$ and the command value $\omega_2^*$ to calculate a velocity deviation ($\omega_2^* - \omega_e$) between the speed $\omega_e$ and the command value $\omega_2^*$. The speed $\omega_e$ is calculated by the location•speed estimator 20.

The speed controller 17 calculates, based on proportional integral control or the like, the δ-axis current command value is* such that the velocity deviation ($\omega_2^* - \omega_e$) converges to zero, and the speed controller 17 outputs the δ-axis current command value $i_\delta^*$.

The magnetic flux controller 16 determines the γ-axis current command value $i_\gamma^*$ and outputs the γ-axis current command value $i_\gamma^*$ to the subtractor 14. The γ-axis current command value $i_\gamma^*$ may take various values depending on the type of the vector control executed by the motor control device 3 or the speed W of the motor 1. For example, when maximum torque control is performed such that the d-axis current is adjusted to be zero, the γ-axis current command value $i_\gamma^*$ is set to 0. Moreover, when field weakening control is performed by causing the d-axis current, the γ-axis current command value $i_\gamma^*$ is set to a negative value according to the speed $\omega_e$. An example in which the γ-axis current command value $i_\gamma^*$ is 0 will be described below.

The subtractor 13 subtracts the γ-axis current $i_\gamma$ output from the coordinate converter 12 from the γ-axis current command value $i_\gamma^*$ output from the magnetic flux controller 16 to calculate a current error ($i_\gamma^* - i_\gamma$). The subtractor 14 subtracts the δ-axis current $i_\delta$ output from the coordinate converter 12 from the value is* output from the speed controller 17 to calculate a current error ($i_\delta^* - i_\delta$).

The current controller 15 performs current feedback control by proportional integral control or the like such that both the current errors ($i_\gamma^* - i_\gamma$) and ($i_\delta^* - i_\delta$) converge to zero. At this time, decoupling control for eliminating interference between the γ-axis and the δ-axis is used to calculate the γ-axis voltage command value $v_\gamma^*$ and the δ-axis voltage command value $v_\delta^*$ such that both the ($i_\gamma^* - i_\gamma$) and ($i_\delta^* - i_\delta$) converge to zero.

The coordinate converter 18 performs coordinate transformation of the $v_\gamma^*$ and the $v_\delta^*$ given from the current controller 15 20 onto a three-phase fixed coordinate axis based on the rotor location $\theta_e$ output from the location•speed estimator, thereby calculating and outputting voltage command values ($v_u^*$, $v_v^*$, and $v_w^*$).

The location•speed estimator 20 estimates the rotor location $\theta_e$ and the speed $\omega_e$. More specifically, the location•speed estimator 20 performs proportional integral control or the like based on all or some of the $i_\gamma$ and the $i_\delta$ from the coordinate converter 12 and the $v_\gamma^*$ and the $v_\delta^*$ from the current controller 15. The location•speed estimator 20 estimates the rotor location $\theta_e$ and the speed $\omega_e$ such that an axis error ($\theta_e - \theta$) between the d-axis and the γ-axis converges to zero. Note that various methods have been proposed as the method of estimating the rotor location $\theta_e$ and the speed $\omega_e$, and the location•speed estimator 20 may adopt any publicly known method.

The step-out detector 21 determines whether or not the motor 1 steps out. More specifically, the step-out detector 21 determines, based on the magnetic flux of the motor 1, whether or not the motor 1 steps out. The magnetic flux of the motor 1 is obtained from the d-axis current, the q-axis current, the γ-axis voltage command value $v_\gamma^*$, and the δ-axis voltage command value $v_\delta^*$. The step-out detector 21 may determine that the motor 1 steps out when the amplitude of the magnetic flux of the motor 1 is less than a threshold. Note that the threshold is accordingly defined based on the amplitude of the magnetic flux generated by the permanent magnet of the motor 1. Note that various methods have been proposed as step-out detection methods, and the step-out detector 154 may adopt any publicly known method.

The setting unit 22 determines and updates the command value $\omega_2^*$ in the motor control device 3. Note that defining the command value $\omega_2^*$ by the setting unit 22 when the setting unit 22 receives the target value $\omega_1^*$ from the input/output unit 7 may be referred to as "determination of the command value $\omega_2^*$". Moreover, defining the command value $\omega_2^*$ by the setting unit 22 at any timing after the "determination of the command value $\omega_2^*$" may be referred to as an "update of the command value $\omega_2^*$".

More specifically, the setting unit 22 determines and updates the command value $\omega_2^*$ based on the target value $\omega_1^*$ received from the input/output unit 7. The setting unit 22 refers to a parameter to determine and update the command value $\omega_2^*$. The parameter is defined by a value relating to at least one of the voltage $V_{dc}$ of the direct-current power supply 8 for the motor 1 or the magnitude of the load applied to the motor 1 during rotation of the motor 1. In the present embodiment, the parameter includes a modulation degree and a torque current value.

The modulation degree is a value relating to conversion from a direct-current voltage into an alternating-current voltage. The modulation degree is also referred to as a modulation factor. In the present embodiment, the modulation degree is defined by the voltage $V_{dc}$ of the direct-current power supply 8 in the inverter circuit unit 2 and the target value (the voltage command values $v_u^*$, $v_v^*$, and $v_w^*$) of the drive voltage $V_a$ given to the inverter circuit unit 2. Specifically, the modulation degree is given by $2*V_{out}/V_{in}$, where $V_{in}$ is the value of the voltage $V_{dc}$ of the direct-current power supply 8, and $V_{out}$ is a crest value of the target value of the drive voltage $V_a$. The crest value of the target value of the drive voltage $V_a$ is a crest value of each of the U-phase voltage $v_u$, the V-phase voltage $v_v$, and the W-phase voltage $v_w$ respectively corresponding to the voltage command values $v_u^*$, $v_v^*$, and $v_w^*$. Note that since the crest values of the U-phase voltage $v_u$, the V-phase voltage $v_v$, and the W-phase voltage $v_w$ match each other, the crest value of the target value of the drive voltage $V_a$ is equal to the crest value of any one of the U-phase voltage $v_u$, the V-phase voltage $v_v$, and the W-phase voltage $v_w$ respectively corresponding to the voltage command values $v_u^*$, $v_v^*$, and $v_w^*$.

The torque current value represents the magnitude of a torque component of the current (the phase currents $i_u$, $i_v$, and $i_w$) flowing through the motor 1. In the present embodiment, the value of the δ-axis current $i_δ$ corresponding to the value of the q-axis current is used as the torque current value.

The setting unit 22 determines (updates) the command value $ω_2^*$ based on a comparison result between the parameter and the threshold. More specifically, the setting unit 22 determines, based on the comparison result of the parameter and the threshold, whether or not the parameter satisfies a condition. The condition is a condition for switching ways of determination and update of the command value $ω_2^*$, and is also referred to as a switching condition below. If the parameter does not satisfy the switching condition, the setting unit 22 causes the command value $ω_2^*$ to be close to the target value $ω_1^*$ of the speed of the motor 1. In contrast, if the parameter satisfies the switching condition, the setting unit 22 reduces the command value $ω_2^*$. For example, the setting unit 22 may subtract a prescribed value from the command value $ω_2^*$. Alternatively, the setting unit 22 may reduce the command value $ω_2^*$ by setting the command value $ω_2^*$ to the speed $ω_e$ obtained by the location•speed estimator 20. However, when the command value $ω_2^*$ is changed, the command value $ω_2^*$ is changed within a range that the speed controller 17 can follow.

In the present embodiment, the parameter includes the modulation degree and the torque current value (the value of the q-axis current), and therefore, the threshold includes a modulation degree threshold corresponding to the modulation degree and a current threshold corresponding to the torque current value.

The modulation degree threshold is, for example, a value for determining whether or not the operation of the inverter circuit unit 2 is within an allowable range. The modulation degree threshold may be selected from a range of the modulation degree (a modulation degree allowable range) within which an output (the drive voltage $V_a$) of the inverter circuit unit 2 can be linearly varied with respect to the modulation degree. The modulation degree threshold may be the upper limit value of the modulation degree allowable range or any value as long as it is within the modulation degree allowable range. The upper limit value of the modulation degree allowable range depends also on the configuration of the inverter circuit unit 2, but in many cases, the upper limit value is, for example, within the range of 75% to 125% or the range of 85% to 115%, and in the present embodiment, the upper limit value is 100%. It is of course efficient that the modulation degree threshold is close to the upper limit value of the modulation degree allowable range.

The current threshold is, for example, a value for determining whether or not the load applied to the motor 1 while the motor 1 is rotating is within an allowable range. The current threshold may be selected from a range (a load torque allowable range) of the torque current value when the load applied to the motor 1 during rotation of the motor 1 is in the allowable range. The current threshold may be the upper limit value of the load torque allowable range or any value as long as it is within the load torque allowable range. It is of course efficient that the current threshold is close to the upper limit value of the load torque allowable range, but in many cases, the current threshold is limited by current rating of the inverter circuit unit 2 and/or current rating of the motor 1, and in the present embodiment, the current threshold is the current rating of the inverter circuit unit 2.

If at least one of a first condition that the module degree exceeds the modulation degree threshold or a second condition that the torque current value (the value of the q-axis current) exceeds the current threshold is satisfied, the setting unit 22 determines that the parameter satisfies the switching condition. In other words, when neither the first condition nor the second condition is satisfied, the setting unit 22 determines that the parameter does not satisfy the switching condition.

1.3 Operation

Figure 3:
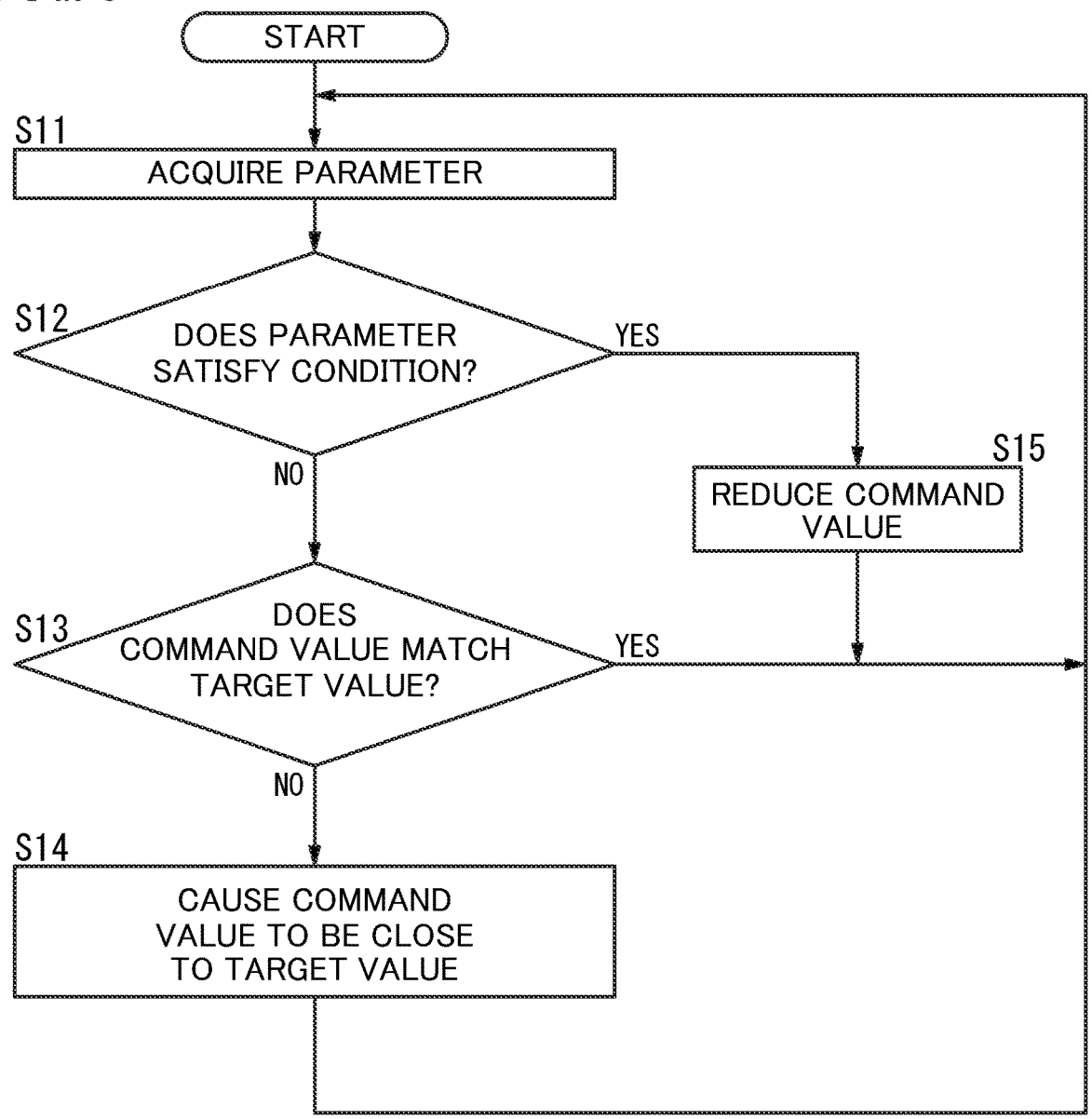
FIG. 3 is a flowchart illustrating operation of the motor control device.
Figure 4:
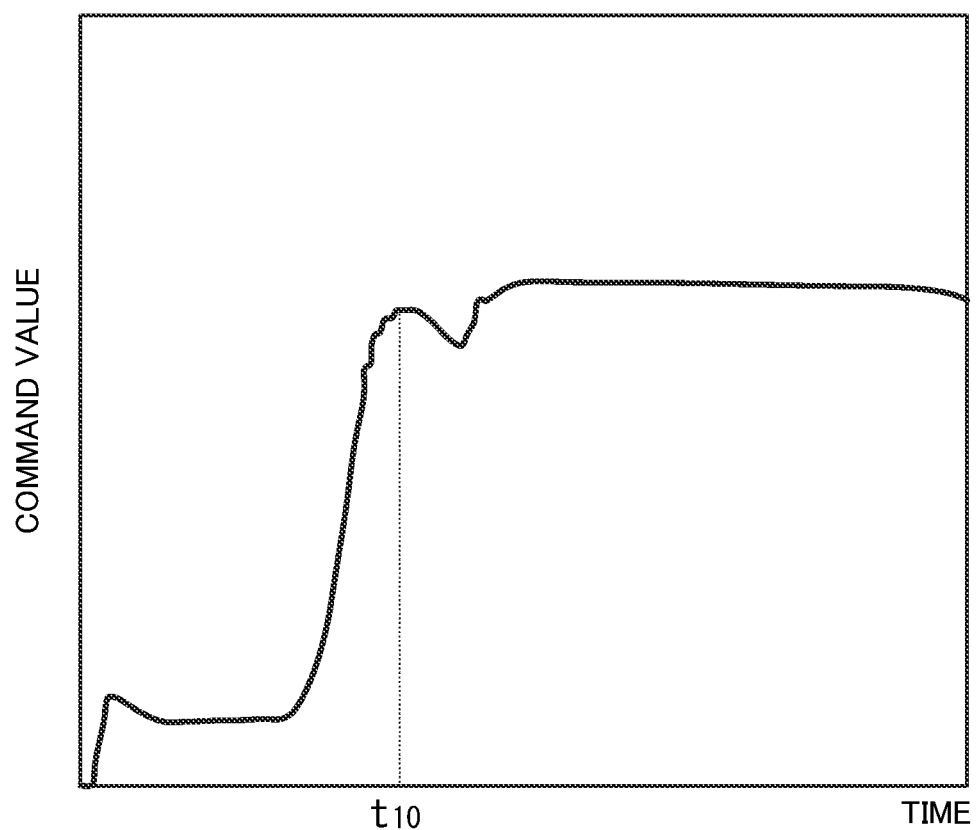
FIG. 4 is a graph illustrating changes with time of a command value of the speed of a motor.
Figure 5:
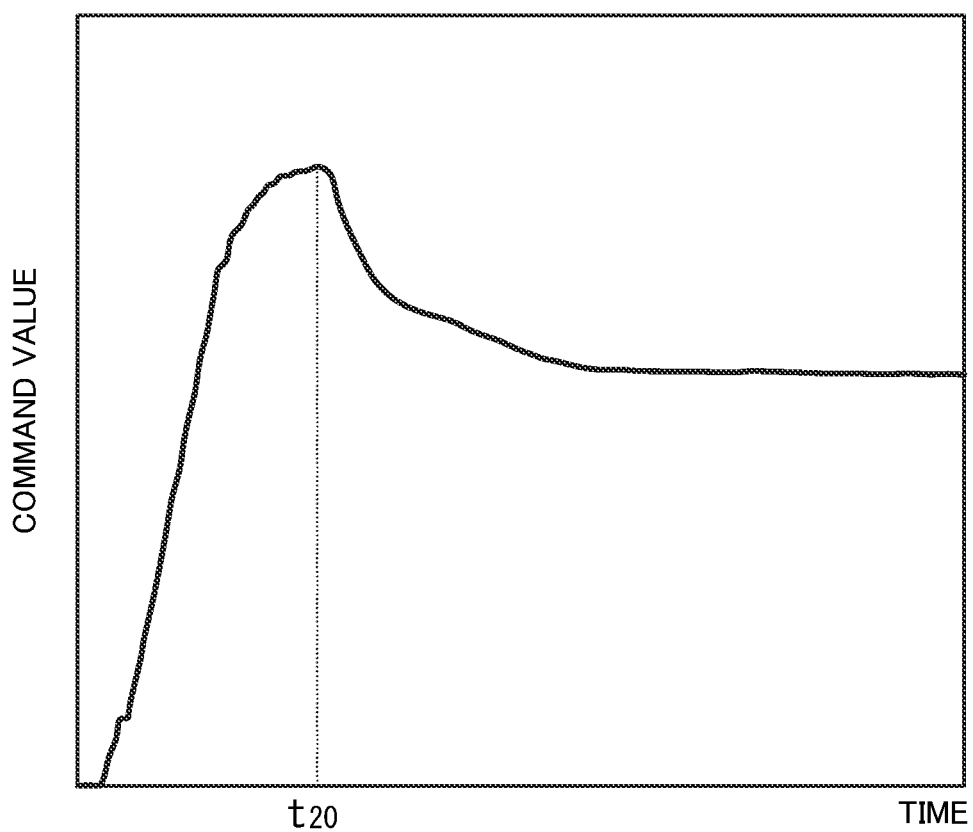
FIG. 5 is another graph illustrating changes with time of the command value of the speed of the motor.

Next, operation of the electric tool 100, in particular, operation of the setting unit 22 of the motor control device 3 will be described with reference to the flowchart in FIG. 3 and the graphs in FIGS. 4 and 5. FIG. 4 shows changes with time of the command value $ω_2^*$ when a wood screw is screwed with the electric tool 100. FIG. 5 shows changes with time of the command value $ω_2^*$ when a bolt is screwed with the electric tool 100.

When the setting unit 22 receives the target value $ω_1^*$ from the input/output unit 7, or at an arbitrary timing thereafter, the setting unit 22 starts the process of determination and update of the command value $ω_2^*$. First, the setting unit 22 acquires a parameter (S11). Here, the setting unit 22 acquires the modulation degree and the torque current value. Then, the setting unit 22 determines whether or not the parameter (the modulation degree and the torque current value) satisfies the condition (the switching condition) (S12). In this embodiment, the setting unit 22 independently determines whether the first condition that the modulation degree exceeds the modulation degree threshold is satisfied and the second condition that the torque current value exceeds the current threshold is satisfied.

If neither the first condition nor the second condition is satisfied, the setting unit 22 determines that the parameter does not satisfy the switching condition (S12; No). In this case, the setting unit 22 determines whether or not the command value $ω_2^*$ matches the target value $ω_1^*$ (S13). If the command value $ω_2^*$ does not match the target value $ω_1^*$ (S13; No), the setting unit 22 causes the command value $ω_2^*$ to be close to the target value $ω_1^*$ (S14). That is, the setting unit 22 increases the command value $ω_2^*$ when the command value $ω_2^*$ is smaller than the target value $ω_1^*$, and the setting unit 22 reduces the command value $ω_2^*$ when the command value $ω_2^*$ is larger than target value $ω_1^*$. When the command value $ω_2^*$ matches the target value $ω_1^*$ (S13; Yes), the setting unit 22 maintains the command value $ω_2^*$. For example, in FIG. 4, the parameter does not satisfy the switching condition until time t10, and the setting unit 22 gradually changes the command value $ω_2^*$ such that the command value $ω_2^*$ matches the target value $ω_1^*$. Similarly, in FIG. 5, until time t20, the parameter does not satisfy the switching condition, and therefore, the setting unit 22 gradually changes the command value $\omega_2^*$ such that the command value $\omega_2^*$ matches the target value $\omega_1^*$.

In contrast, when at least one of the first condition or the second condition is satisfied, the setting unit 22 determines that the parameter satisfies the switching condition (S12; Yes). In this case, the setting unit 22 reduces the command value $\omega_2^*$ (S15). For example, in FIG. 4, the parameter satisfies the switching condition at the time t10, and hereafter, the setting unit 22 gradually reduces the command value $\omega_2^*$ irrespectively of the target value $\omega_1^*$. Similarly, in FIG. 5, the parameter satisfies the switching condition at the time t20, and therefore, the setting unit 22 gradually reduces the command value $\omega_2^*$ irrespectively of the target value $\omega_1^*$. Thus, the motor control device 3 no longer attempts to forcibly maintain the speed of the motor 1, and therefore, the motor 1 is prevented from stepping out, so that the motor control device 3 can continue driving the motor 1. In particular, when the modulation degree threshold is the upper limit value of the modulation allowable range, the motor control device 3 can continue driving the motor 1 at a maximum speed (a maximum rotation speed) that suits the modulation degree threshold even when the voltage $V_{dc}$ of the direct-current power supply 8 varies.

As described above, when the parameter does not satisfy the switching condition (at the time of normal operation), the motor control device 3 sets the command value $\omega_2^*$ such that the speed $\omega$ of the motor 1 approaches the target value $\omega_1^*$ (the target rotation speed) given from the input/output unit 7. That is, the motor control device 3 performs control (normal target value control) of setting the command value $\omega_2^*$ to the target value $\omega_1^*$. On the other hand, when the parameter satisfies the switching condition, the motor control device 3 reduces the command value $\omega_2^*$ irrespectively of the target value cm* given from the input/output unit 7. That is, the motor control device 3 performs control (dynamic speed target value control) of updating the target value $\omega_1^*$ in accordance with the parameter while the motor 1 is rotating.

As described above, the electric tool 100 can dynamically respond to a variation in the voltage $V_{dc}$ of the direct-current power supply 8 and/or a variation in the load (e.g., the load torque) applied while the motor 1 is rotating. Therefore, in response to the variation in the load torque and/or the variation in the voltage $V_{dc}$ of the direct-current power supply 8, the motor 1 can be continuously rotated at the maximum rotation speed at which the motor 1 does not steps out.

Thus, the rotation speed of the motor 1 does not have to be set to a relatively low value in advance to operate the motor 1 in case of a decrease in the voltage $V_{dc}$ and/or an increase in the load torque. In addition, the motor 1 can be optimally operated in accordance with the type of the direct-current power supply 8 and/or charging and discharging conditions. Therefore, the target value $\omega_1^*$ of the speed of the motor 1 does not have to be reset in accordance with the type of the direct-current power supply 8 and/or the charging and discharging conditions.

Moreover, also when a work object (a wood screw, a bolt, etc.) and/or target work (screwing, boring, retightening, etc.) changes, the motor 1 can be operated, in accordance with the work object and/or the target work, at the maximum speed (the maximum rotation speed) at which the motor 1 does not step out. Therefore, complicated control and/or setting of a speed target value according to a work mode is no longer necessary. As a result, a time required to complete work can be reduced, and the work efficiency can be increased.

Moreover, the amount of power consumed by the direct-current power supply 8 can be reduced.

As described above, the electric tool 100 of the present embodiment improves the work efficiency. Moreover, the electric tool 100 reduces the amount of power consumption. In addition, the electric tool 100 improves the stability of the work.

1.4 Summary

As described above, the electric tool 100 includes the motor 1 and the motor control device 3. The motor control device 3 updates a command value $\omega_2^*$ of the speed of the motor 1 based on a parameter relating to at least one of a voltage $V_{dc}$ of a direct-current power supply 8 for the motor 1 or the magnitude of a load applied to the motor 1 during rotation of the motor 1. Thus, the electric tool 100 improves the operation efficiency of the motor 1.

In other words, the motor control device 3 executes a control method (the motor control method) described below. The control method is a control method of the motor 1 and includes updating a command value $\omega_2^*$ of the speed of the motor 1 based on a parameter relating to at least one of a voltage $V_{dc}$ of a direct-current power supply 8 for the motor 1 or the magnitude of a load applied to the motor 1 during rotation of the motor 1. The control method improves the operation efficiency of the motor 1.

The motor control device 3 is implemented by a computer system. That is, the motor control device 3 is implemented by a program (a motor control program) executed by the computer system. The program is a program for causing the computer system to execute the control method (the motor control method). Such a program improves the operation efficiency of the motor 1 in a similar manner to the control method.

2. Variations

The embodiment of the present disclosure is not limited to the above-described embodiment. Various modifications may be made depending on design and the like as long as the object of the present disclosure is achieved. Variations of the embodiment will be described below.

In the above-described embodiment, the parameter includes two parameters, namely, the modulation degree and the torque current value, but the parameter may be only the modulation degree. In this case, if the modulation degree is lower than or equal to the modulation degree threshold, the motor control device 3 (the setting unit 22) may cause the command value $\omega_2^*$ to be close to the target value $\omega_1^*$ of the speed of the motor 1. In contrast, if the modulation degree exceeds the modulation degree threshold, the motor control device 3 (the setting unit 22) may reduce the command value $\omega_2^*$. Alternatively, the parameter may be only the torque current value. In this case, if the torque current value (the value of the q-axis current) is smaller than or equal to the current threshold, the motor control device 3 (the setting unit 22) may cause the command value $\omega_2^*$ to be close to the target value $\omega_1^*$ of the speed of the motor 1. In contrast, if the torque current value (the value of the q-axis current) exceeds the current threshold, the motor control device 3 (the setting unit 22) may reduce the command value $\omega_2^*$.

The parameter is not limited to the modulation degree and the torque current value. As the parameter, a power supply voltage value representing the magnitude of the voltage $V_{dc}$ of the direct-current power supply 8 may be used. In this case, a voltage threshold corresponding to the power supply voltage value is used as the threshold. The voltage threshold is, for example, a value for determining whether or not the value of the voltage $V_{dc}$ of the direct-current power supply 8 is within an allowable range. The voltage threshold may be selected from a range (a voltage allowable range) within which the drive voltage $V_a$ satisfying the target values (the voltage command values $v_u^*$, $v_v^*$, and $v_w^*$) of the drive voltage $V_a$ from the direct-current power supply 8 can be generated. The voltage threshold may be the lower limit value of the voltage allowable range or may be any value as long as it is within the voltage allowable range. It is of course efficient that the voltage threshold is close to the upper limit value of the voltage allowable range. If the power supply voltage value is larger than or equal to the voltage threshold, the motor control device 3 (the setting unit 22) may cause the command value $\omega_2^*$ to be close to the target value $\omega_1^*$ of the speed of the motor 1. In contrast, if the power supply voltage value is smaller than the voltage threshold, the motor control device 3 (the setting unit 22) may reduce the command value $\omega_2^*$, and also in this case, the same effect as that obtained when the parameter is the modulation degree is obtained.

As described above, the parameter may include one or more values selected from the modulation degree, the torque current value, and the power supply voltage value. When the parameter includes two or more values selected from the modulation degree, the torque current value, and the power supply voltage value, it may be determined that the parameter satisfies the condition when the determination of reducing the command value $\omega_2^*$ is obtained with regard to any of the two or more values. Alternatively, priority levels may be given to the two or more values included in the parameter, and when the determination of reducing the command value $\omega_2^*$ is obtained with regard to a value with a high priority level, it may be determined that the parameter satisfies the condition irrespectively of the other values.

In the above-described embodiment, the voltages $v_u$, $v_v$, and $v_w$ respectively of the U phase, the V phase, and the W phase of the drive voltage $V_a$ are sinusoidal voltages. However, the voltages $v_u$, $v_v$, and $v_w$ respectively of the U phase, the V phase, and the W phase of the drive voltage $V_a$ may be rectangular voltages. That is, the inverter circuit unit 2 may sine-wave drive the motor 1 or may rectangular-wave drive the motor 1.

In the above-described embodiment, the motor control device 3 controls the motor 1 by the vector control without a sensor. The control method of the motor control device 3 is not limited to the vector control but may be other methods such as 120-degree energization control. Moreover, the electric tool 100 may include a location sensor for detecting the location (a rotor rotational position) of the motor 1. Furthermore, the sensor (e.g., the phase current sensor 11) configured to detect the current of the motor 1 may be omitted in other methods such as the 120-degrees energization control. In the case of the vector control, a shunt resistor or the like, other than the phase current sensor 11, installed in the inverter circuit unit 2 may be used. That is, a current measuring instrument including a shunt resistor or the like in place of the phase current sensor 11 may be used. In these cases, a simplified method may be used as the control method of the motor control device 3, which leads to simplification of circuits and/or control.

In the above-described embodiment, the electric tool 100 includes the spindle 4, the hammer 5, and the anvil 6 as devices for performing the prescribed work. However, such devices are not limited to the spindle 4, the hammer 5, and the anvil 6 but may be, for example, a drill and a saw. That is, the electric tool 100 is not limited to the impact driver but may be a drill driver or a jigsaw.

A subject that executes the motor control device 3 includes a computer system. The computer system includes, as hardware, a processor and memory. The processor executes a program stored in the memory of the computer system, thereby implementing functions as the subject that executes the motor control device 3 in the present disclosure. The program may be stored in the memory of the computer system in advance or may be provided over a telecommunications network. Alternatively, the program may also be distributed after having been recorded in some non-transitory storage medium such as a memory card, an optical disc, or a hard disk drive, any of which is readable for the computer system. The processor of the computer system includes one or more electronic circuits including a semiconductor integrated circuit (IC) or a large-scale integrated circuit (LSI). The integrated circuit such as IC or LSI mentioned herein may be referred to in another way, depending on the degree of the integration. For example, the integrated circuit may be an integrated circuit called system LSI, very-large-scale integration (VLSI), or ultra-large-scale integration (VLSI). A field programmable gate array (FGPA), which is programmable after fabrication of the LSI, or a reconfigurable logical device which allows reconfiguration of connections in LSI or setup of circuit cells in LSI may be used for the same purpose. Those electronic circuits may be either integrated together on a single chip or distributed on multiple chips, whichever is appropriate. The plurality of chips may be collected in one device or may be distributed in a plurality of devices.

3. Aspects

As can be seen from the above-described embodiment and variations, the present disclosure includes the below-described aspects. In the following description, reference signs in parentheses are added only to clarify the correspondence relationship to the embodiment.

An electric tool (100) of a first aspect includes a motor (1) and a motor control device (3). The motor control device (3) is configured to update a command value ($\omega_2^*$) of a speed of the motor (1) based on a parameter. The parameter relates to at least one of a voltage ($V_{dc}$) of a direct-current power supply (8) for the motor (1) or a magnitude of a load applied to the motor (1) during rotation of the motor (1). The first aspect enables the operation efficiency of the motor (1) to be improved.

An electric tool (100) of a second aspect, which may be realized in combination with the first aspect. In the second aspect, the motor control device (3) is configured to update the command value ($\omega_2^*$) based on a comparison result between the parameter and a threshold. The second aspect enables the operation efficiency of the motor (1) to be improved.

An electric tool (100) of a third aspect, which may be realized in combination with the second aspect. In the third aspect, the parameter includes a modulation degree. The third aspect enables the operation efficiency of the motor (1) to be improved.

An electric tool (100) of a fourth aspect, which may be realized in combination with the third aspect. In the fourth aspect, the threshold includes a modulation degree threshold. The motor control device (3) is configured to reduce the command value ($\omega_2^*$) when the modulation degree is higher than the modulation degree threshold. The fourth aspect reduces the possibility that the motor (1) steps out.

An electric tool (100) of a fifth aspect, which may be realized in combination with the fourth aspect. In the fifth aspect, the motor control device (3) is configured to cause the command value ($\omega_2^*$) to be close to a target value ($\omega_1^*$) of the speed of the motor (1) when the modulation degree is lower than or equal to the modulation degree threshold. The fifth aspect enables the speed of the motor (1) to be set to a desired target value ($\omega_1^*$).

An electric tool (100) of a sixth aspect, which may be realized in combination with any one of the second to fifth aspects. In the sixth aspect, the parameter includes a torque current value representing a magnitude of a torque component of a current that flows through the motor (1). The sixth aspect enables the operation efficiency of the motor (1) to be improved.

An electric tool (100) of a seventh aspect, which may be realized in combination with the sixth aspect. In the seventh aspect, the threshold includes a current threshold. The motor control device (3) is configured to reduce the command value ($\omega_2^*$) when the torque current value is larger than the current threshold. The seventh aspect reduces the possibility that the motor (1) steps out.

An electric tool (100) of an eighth aspect, which may be realized in combination with the seventh aspect. In the eighth aspect, the motor control device (3) is configured to cause the command value ($\omega_2^*$) to be close to the target value ($\omega_1^*$) of the speed of the motor (1) when the torque current value is smaller than or equal to the current threshold. The eighth aspect enables the speed of the motor (1) to be set to a desired target value ($\omega_1^*$).

An electric tool (100) of a ninth aspect, which may be realized in combination with any one of the second to eighth aspects. In the ninth aspect, the parameter includes a power supply voltage value representing a magnitude of the voltage ($V_{dc}$) of the direct-current power supply (8). The ninth aspect enables the operation efficiency of the motor (1) to be improved.

An electric tool (100) of a tenth aspect, which may be realized in combination with the ninth aspect. In the tenth aspect, the threshold includes a voltage threshold. The motor control device (3) is configured to reduce the command value ($\omega_2^*$) when the power supply voltage value is smaller than the voltage threshold. The tenth aspect reduces the possibility that the motor (1) steps out.

An electric tool (100) of an eleventh aspect, which may be realized in combination with the tenth aspect. In the eleventh aspect, the motor control device (3) is configured to cause the command value ($\omega_2^*$) to be close to the target value ($\omega_1^*$) of the speed of the motor (1) when the power supply voltage value is larger than or equal to the voltage threshold. The eleventh aspect enables the speed of the motor (1) to be set to a desired target value ($\omega_1^*$).

An electric tool (100) of a twelfth aspect, which may be realized in combination with any one of the first to eleventh aspects. In the twelfth aspect, the motor (1) is a brushless motor. The twelfth aspect enables the operation efficiency of the motor (1) to be improved.

An electric tool (100) of a thirteenth aspect, which may be realized in combination with the twelfth aspect. In the thirteenth aspect, the electric tool (100) further includes an inverter circuit unit (2) configured to generate a drive voltage (Va) from the direct-current power supply (8) and output the drive voltage (Va) to the motor (1). The motor control device (3) is configured to determine a target value ($v_u^*, v_v^*, v_w^*$) of the drive voltage (Va) such that the speed of the motor (1) matches the command value ($\omega_2^*$) and give the target value to the inverter circuit unit (2). The thirteenth aspect enables the operation efficiency of the motor (1) to be improved.

A control method of a fourteenth aspect is a control method of the motor (1). The control method includes updating a command value ($\omega_2^*$) of a speed of the motor (1) based on a parameter relating to at least one of a voltage ($V_{dc}$) of a direct-current power supply (8) for the motor (1) or a magnitude of a load applied to the motor (1) during rotation of the motor (1). The fourteenth aspect provides the effect that the operation efficiency of the motor (1) can be improved.

A program of a fifteenth aspect is a program for causing a computer system to execute the control method of the fourteenth aspect. The fifteenth aspect provides the effect that the operation efficiency of the motor (1) can be improved.

REFERENCE SIGNS LIST

100 ELECTRIC TOOL
1 MOTOR
2 INVERTER CIRCUIT UNIT
3 MOTOR CONTROL DEVICE
8 DIRECT-CURRENT POWER SUPPLY
$\omega_1^*$ TARGET VALUE
$\omega_2^*$ COMMAND VALUE
Va DRIVE VOLTAGE
$v_u^*, v_v^*, v_w^*$ TARGET VALUE
$V_{dc}$ VOLTAGE

The invention claimed is:
1. An electric tool, comprising:
a motor;
a motor control device;
an inverter circuit unit configured to generate a drive voltage from a direct-current power supply and output the drive voltage to the motor; and
an input/output unit being a user interface,
the input/output unit being configured to determine a target value of a speed of the motor in accordance with an operation given by a user, and give the target value to the motor control device,
the motor control device being configured to determine and update a command value of the speed of the motor based on the target value of the speed of the motor given by the input/output unit, and determine a target value of the drive voltage such that the speed of the motor matches the command value and give the target value of the drive voltage to the inverter circuit unit,
the motor control device being configured to update the command value of the speed of the motor based on a parameter relating to at least one of the voltage of the direct-current power supply for the motor or a magnitude of a load applied to the motor during rotation of the motor,
wherein, if the parameter does not satisfy a switching condition,
the motor control device is configured
to cause the command value to be close to the target value of the speed of the motor when the command value does not match the target value of the speed of the motor or
to maintain the command value, when the command value matches the target value of the speed of the motor,
and wherein, if the parameter satisfies the switching condition, the motor control device is configured to reduce the command value.

2. The electric tool of claim 1, wherein
the motor control device is configured to update the command value based on a comparison result between the parameter and a threshold.
3. The electric tool of claim 2, wherein
the parameter includes a modulation degree.
4. The electric tool of claim 3, wherein
the threshold includes a modulation degree threshold, and
the motor control device is configured to reduce the command value when the modulation degree is higher than the modulation degree threshold.
5. The electric tool of claim 4, wherein
the motor control device is configured to cause the command value to be close to the target value of the speed of the motor when the modulation degree is lower than or equal to the modulation degree threshold.
6. The electric tool of claim 2, wherein
the parameter includes a torque current value representing a magnitude of a torque component of a current that flows through the motor.
7. The electric tool of claim 6, wherein
the threshold includes a current threshold, and
the motor control device is configured to reduce the command value when the torque current value is larger than the current threshold.
8. The electric tool of claim 7, wherein
the motor control device is configured to cause the command value to be close to the target value of the speed of the motor when the torque current value is smaller than or equal to the current threshold.
9. The electric tool of claim 2, wherein
the parameter includes a power supply voltage value representing a magnitude of the voltage of the direct-current power supply.
10. The electric tool of claim 9, wherein
the threshold includes a voltage threshold, and
the motor control device is configured to reduce the command value when the power supply voltage value is smaller than the voltage threshold.
11. The electric tool of claim 10, wherein
the motor control device is configured to cause the command value to be close to the target value of the speed of the motor when the power supply voltage value is larger than or equal to the voltage threshold.
12. The electric tool of claim 1, wherein
the motor is a brushless motor.
13. A control method of a motor, the control method comprising:
generating a drive voltage from a direct-current power supply and outputting the drive voltage to the motor by an inverter circuit unit; and
determining a target value of a speed of the motor in accordance with an operation given by a user,
determining and updating a command value of the speed of the motor based on the target value of the speed of the motor, and
determining a target value of the drive voltage such that the speed of the motor matches the command value and giving the target value of the drive voltage to the inverter circuit unit
updating the command value of the speed of the motor based on a parameter relating to at least one of a voltage of the direct-current power supply for the motor or a magnitude of a load applied to the motor during rotation of the motor
the method further comprising,
if the parameter does not satisfy a switching condition,
causing the command value to be close to the target value of the speed of the motor when the command value does not match the target value of the speed of the motor or
maintaining the command value when the command value matches the target value of the speed of the motor,
and if the parameter satisfies the switching condition, reducing the command value.
14. A non-transitory computer readable storage medium recording a program configured to cause a computer system to execute the control method of claim 13.

* * * * *